United States Patent [19]

Fang

[11] Patent Number: 5,035,728
[45] Date of Patent: Jul. 30, 1991

[54] AIR CLEANER ASSEMBLY

[75] Inventor: Roger C. Fang, Alhambra, Calif.

[73] Assignee: Tatung Company of America, Inc., Long Beach, Calif.

[21] Appl. No.: 552,906

[22] Filed: Jul. 16, 1990

[51] Int. Cl.$^5$ .............................................. B03C 3/68
[52] U.S. Cl. ...................................... 55/106; 55/124; 55/126; 422/120
[58] Field of Search ................ 55/106, 124, 128, 129, 55/134, 107, 126, 152; 422/4, 5, 119, 120, 121

[56] References Cited

U.S. PATENT DOCUMENTS

| 2,593,377 | 4/1952 | Wintermute | 55/124 X |
| 3,668,833 | 6/1972 | Cahill, Jr. | 55/124 X |
| 3,672,126 | 6/1972 | Goettle | 55/106 |
| 3,745,750 | 7/1973 | Arff | 55/124 X |
| 3,956,458 | 5/1976 | Anderson | 55/134 X |
| 3,988,131 | 10/1976 | Kanazawa et al. | 55/124 X |
| 4,244,712 | 1/1981 | Tongret | 422/121 X |
| 4,252,547 | 2/1981 | Johnson | 422/120 X |
| 4,344,776 | 8/1982 | Yavnieli | 55/129 |

FOREIGN PATENT DOCUMENTS 55-24523  2/1980  Japan ..................................... 55/124

Primary Examiner—Richard L. Chiesa
Attorney, Agent, or Firm—Gene W. Arant

[57] ABSTRACT

A single compact air cleaner unit includes a motor and fan assembly, a mechanical pre-filter, an electrostatic precipitator, a main filter cartridge which is easily removable and which contains both a synthetic mesh media with electrical charges embedded therein and a plastic screen impregnated with activated carbon powder, ionizing needles positioned adjacent a fresh air outlet, an air quality sensing device having an adjustable control for selecting a level of air quality to be achieved, and an automatic control cooperatively associated with the air quality sensing device to keep the unit energized as long as the air being sampled does not meet the selected air quality level.

4 Claims, 4 Drawing Sheets

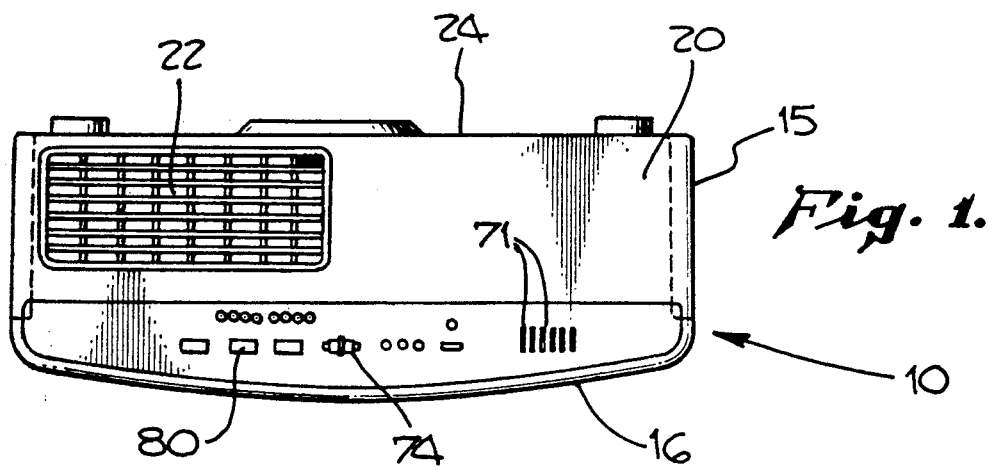
Fig. 1.
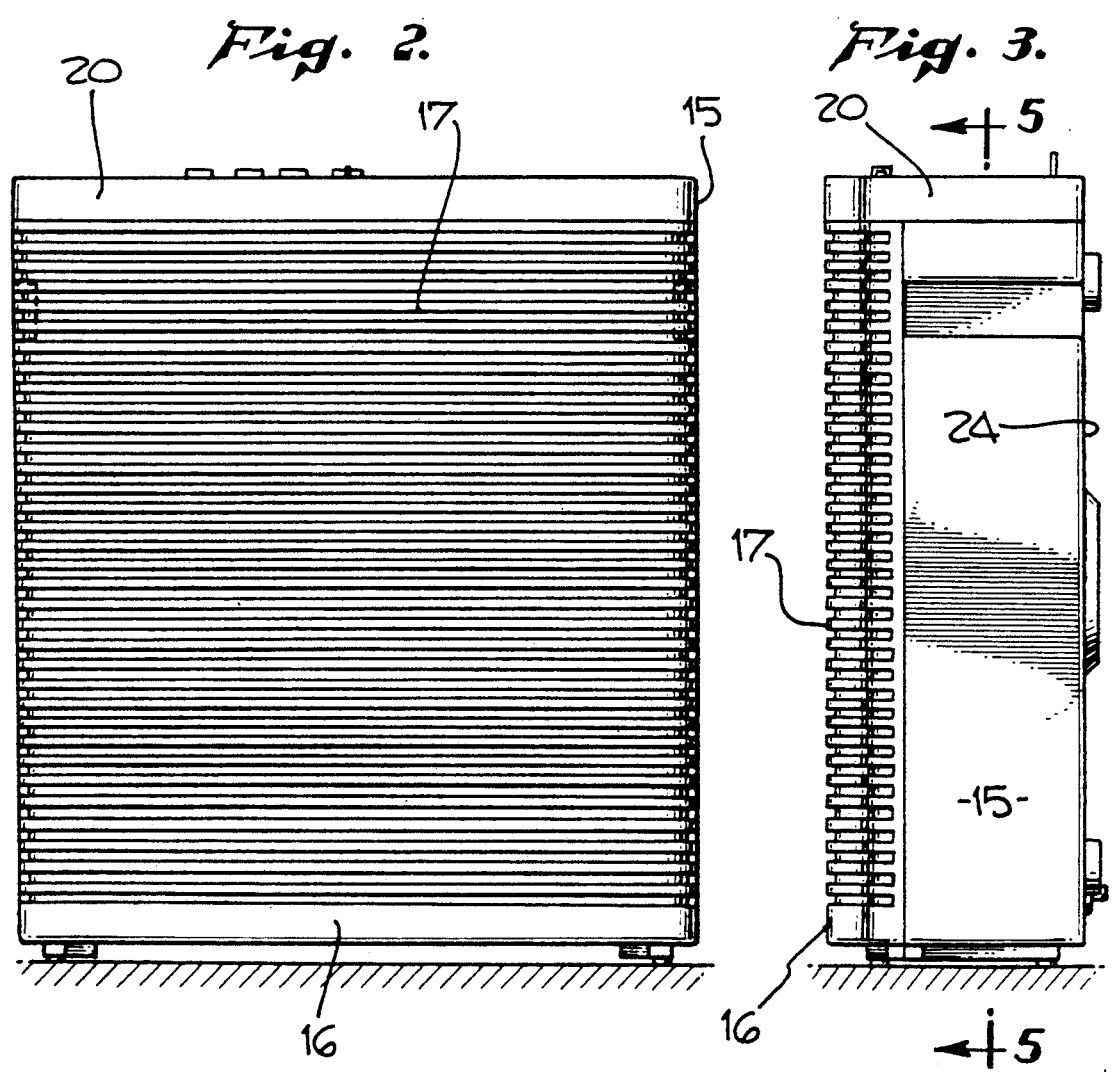
Fig. 2.
Fig. 3.

5,035,728

AIR CLEANER ASSEMBLY

BACKGROUND OF THE INVENTION

The present invention relates to an electrically energized air cleaner for use in homes or offices. It is well known to utilize a stand-alone air cleaner with a self-circulating fan for the removal of both large and small particles from the air of a room. Also, it is well known to utilize activated carbon in an air filter for the purpose of adsorbing undesirable gases and hence removing them from the air. Nevertheless, there has been substantial room for improvement in this product area, since many aspects of high technology are involved in the manufacture of the apparatus, and there are also many diverse demands of consumers as to the cost and operational characteristics of such apparatus.

SUMMARY OF THE INVENTION

According to the present invention a single compact air cleaner unit includes a motor and fan assembly, a mechanical filter screen, an electrostatic precipitator, a main filter cartridge which is easily removable and contains both a synthetic mesh media with electrical charges embedded therein and a plastic screen impregnated with activated carbon powder, an ionizing needle positioned adjacent a fresh air outlet, an air quality sensing device having an adjustable control for selecting a level of air quality to be achieved, and an automatic control cooperatively associated with the air quality sensing device to keep the unit energized as long as the air being sampled does not meet the selected air quality level.

It is therefore the object of the invention to provide an air cleaner unit which combines all desirable features in a single compact, relatively inexpensive, and easily controlled assembly.

BRIEF DESCRIPTION OF THE DRAWINGS

FIG. 1 is a top plan view of my new air cleaner unit;
FIG. 2 is a front elevation view;
FIG. 3 is a side elevation view.

DETAILED DESCRIPTION OF THE PREFERRED EMBODIMENT (FIGS. 1-8)

Figure 6:
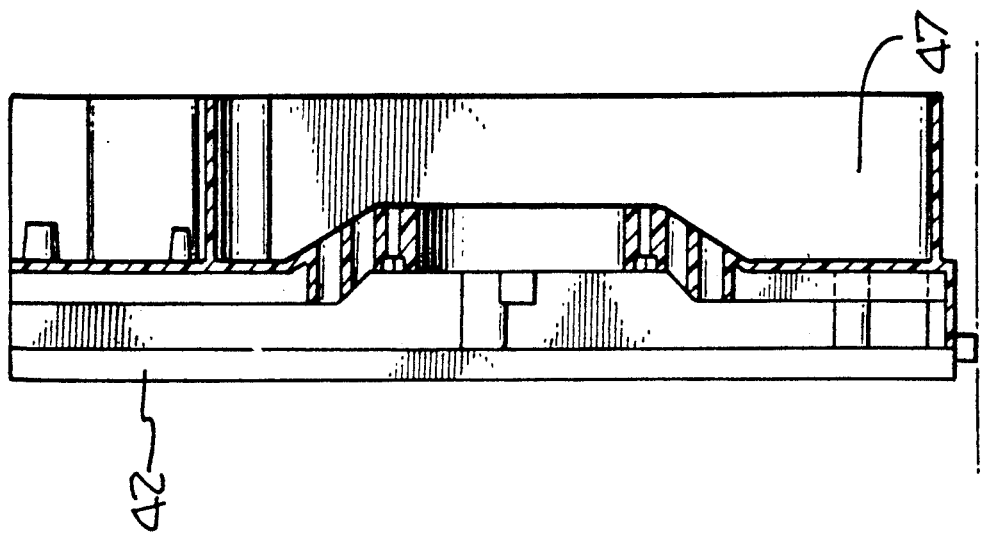
FIG. 6 is a cross-sectional view taken on line 6——6 of FIG. 5.

The novel air cleaner unit 10 is electrically energized for convenient use in a house or office, and includes a housing 15 of generally box-like configuration having a front side 16 with an air intake grill 17 as best seen in FIG. 2. Its back cover 24, seen in FIGS. 1, 3, and 6 is adapted to be placed against a wall or partition. The housing has a top plate 20, see FIGS. 1 and 3, and a fresh air outlet 22 mounted in the top plate, see FIGS. 1 and 4. The top plate 20 contains various controls, discussed in later paragraphs. Various operational portions of the air cleaner unit are arranged in a serial relationship between the air intake grill and the fresh air outlet. As indicated in the upper portion of FIG. 4, fresh air outlet 22 has vanes which may be adjusted in order to control the direction of flow of fresh air generated by the apparatus.

A mechanical pre-filter screen 30 is mounted within the housing 15 adjacent its front side 16. This pre-filter screen is typically nylon mesh with a pore size of 2 millimeters diameter. Its major function is to trap particles such as cloth fibers, animal hair, and other large particles floating in the air which have a size of 50 microns or smaller. (A micron is sometimes thought to be one-millionth of an inch, but is here more correctly used to indicate one-millionth of a meter). This filter is removed and cleaned with a damp cloth after about every one year of operation.

Figure 4:
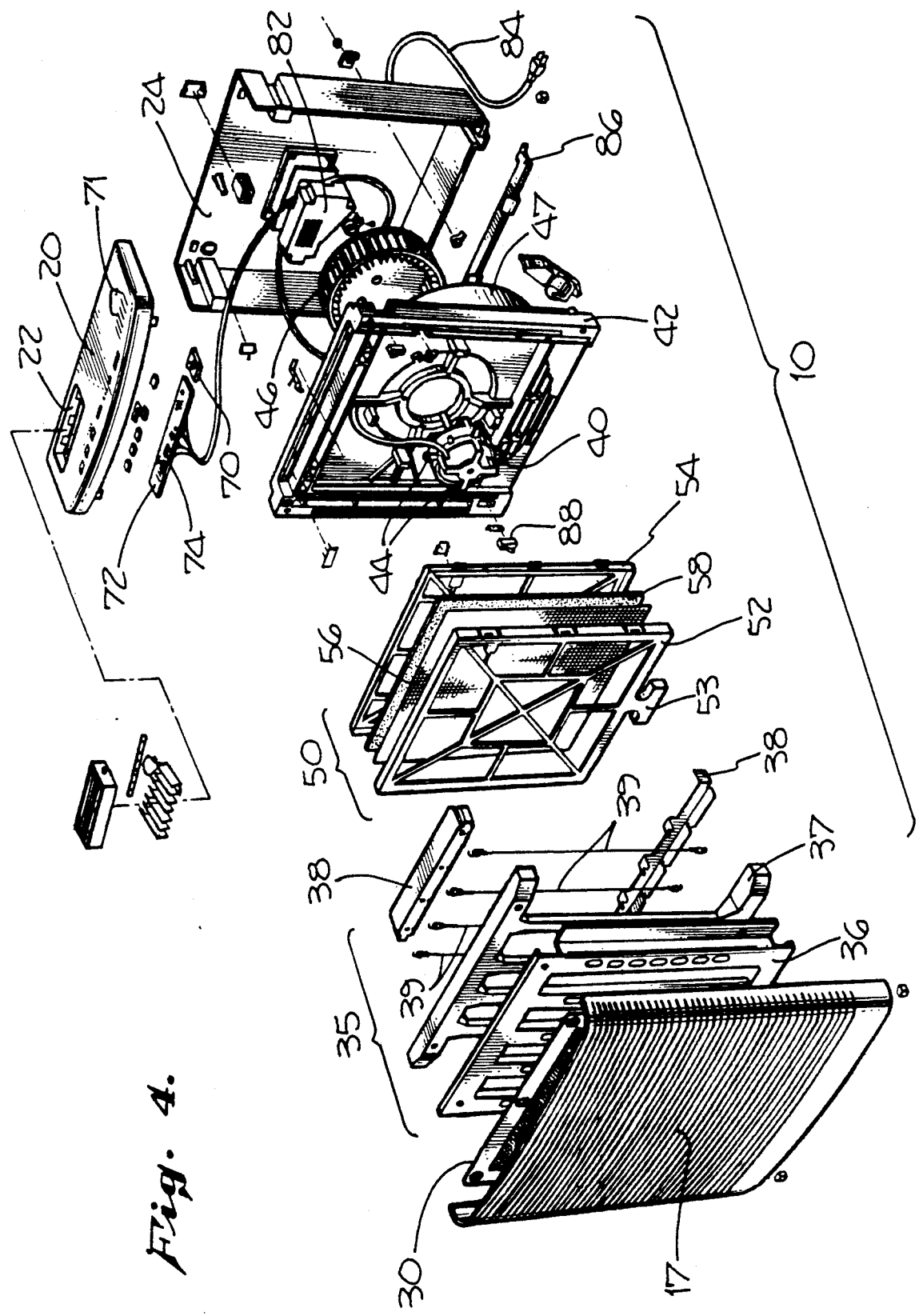
FIG. 4 is an exploded perspective view of the assembly.

An electrostatic precipitator 35 is mounted within the housing on the inner side of the mechanical filter screen 30. The component parts of the precipitator 35 are shown in FIG. 4, and include a front cover 36, a main frame 37, a rear frame 38, and wires 39 suspended from the rear frame. The main frame 37 is a metal plate with a pleated structure, which is electrically grounded. Rear frame 38 consists of parallel upper and lower non-conductive members between which the wires 39 are suspended. Wires 39 are parallel to each other, extend laterally of the air pathway, and are energized with a positive potential which may be as high as 8000 volts. As air flows between the wires, polluting particles become ionized and possess positive charges. All the positively charged moving particles are attracted to the grounded frame 37 and stay on it. Particles even as small as molecular size can be ionized by the high voltage on the wires 39, and hence particles as small as 0.01 micron are trapped by this device.

An electric motor 40 is attached to the front side of a supporting frame 42 by means of screws 44. The motor shaft then passes through a central opening in the frame 42, and is attached to a high efficiency fan or blower 46 which is of the rotary cage type, for both supporting and rotatably driving the blower. Thus, a motor and fan assembly is mounted within the housing 15 adjacent its back cover 24. A power cord extends from motor 40 to a control box 82 mounted in an opening in the back cover 24.

A main filter cartridge 50 is mounted within the housing 15 between the electrostatic precipitator assembly 35 and the motor and fan assembly. The main filter cartridge 50 is easily removable by withdrawing it from the bottom of the housing 15. The cartridge includes two plastic cover plates 52, 54; a synthetic mesh media 56 made of non-conductive fiber with electrical charges embedded therein; and a plastic screen 58 which is impregnated with activated carbon powder. The synthetic mesh media 56 and the plastic screen 58 are constructed differently from each other, and each performs different, but very significant, functions. Both are disposable items which are replaced when the filter cartridge is removed.

The main filter cartridge should be replaced after every 1500 hours of operation. The cover plates 52, 54, have rigid borders but largely open interiors to allow the passage of air. Each frame has a central handle on its lower edge, such as the handle 53 of cover plate 52 —— see FIG. 4. These handles allow easy removal of the cartridge in a downward direction. A snap-on bottom door 86 is located underneath the main filter cartridge 50. There are two release tabs on door 86 which permit it to be opened for removing the filter cartridge.

The synthetic mesh media 56 is preferably of the type sold by 3M Company under its trademark FILTRETE. Its function is to provide a high filtration efficiency while allowing open passage for a high rate of air flow. Thus, more fresh air can be produced per unit time by the FILTRETE media than by ordinary synthetic fibers. Particles larger than the pore size of the filter are mechanically trapped between the fibers. An electrical capture mechanism is performed with the help of electrostatic charges inbedded on all fibers. Since most airborne particles under 5 microns are charged themselves, when they come near a FILTRETE media fiber they become trapped on the fiber magnetically. With both these types of capture mechanisms at work, this filter can remove particles down to 0.1 micron in size, such as bacteria.

The plastic screen 58 is a non-woven screen impregnated with activated carbon powder. The carbon powder provides a large surface area for the adsorption of odors, such as from cooking. Adsorption of odor is a physical action based on molecular forces. When impurities —— minute particles with odors —— are brought in contact with it, the activated carbon attracts and holds the impurities in its internal surface.

At least one ionizing needle 60 is charged at a negative electrical potential, and positioned within the housing 15 below the fresh air outlet 22, supported on a printed circuit board 72 that fits underneath the cover plate 20. In the presently preferred embodiment of the invention there are three such needles, and they are located within the pathway of the fresh air that is being discharged. Each needle is charged to a negative voltage of about 5000 volts. The function of the ionizing needles is to ionize the cleaned air before it leaves the air cleaner assembly 10. By the field ionization effect, at the pin point of each needle, a stream of negative ions is continuously discharged into the surrounding air. These ions collide with small particles that have not been captured previously by the air cleaner, and carry them to the ceiling or walls of the building, which generally bear a slight positive charge.

Figure 5:
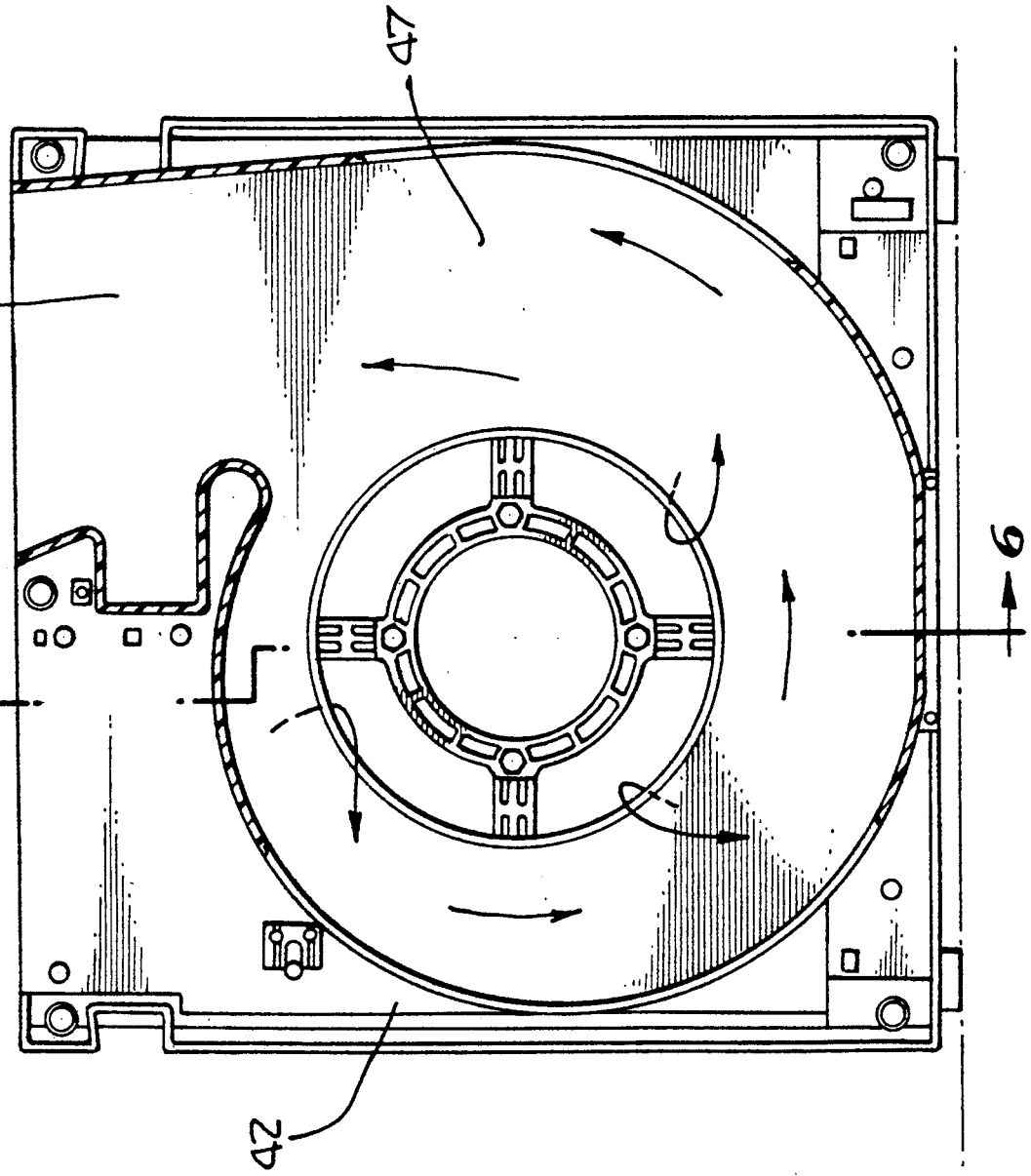
FIG. 5 is a vertical cross-sectional view taken on line 5——5 of FIG. 3 showing an air duct leading to the fresh air outlet.

After passing through main filter 50 and motor frame 42 the filtered air then passes through a scroll-shaped air duct 47 (FIGS. 5 & 6) before entering the fresh air outlet 22.

THE CONTROL SYSTEM (FIGS. 4, 7, & 8)

Figure 7:
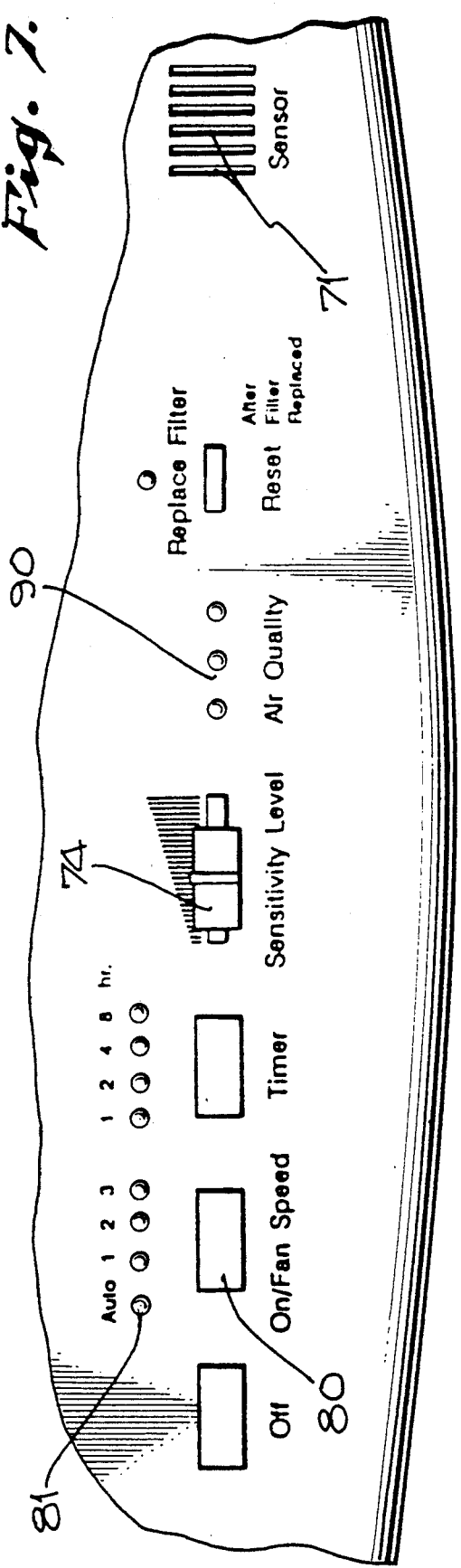
FIG. 7 is a top plan view of the control panel on the top cover.
Figure 8:
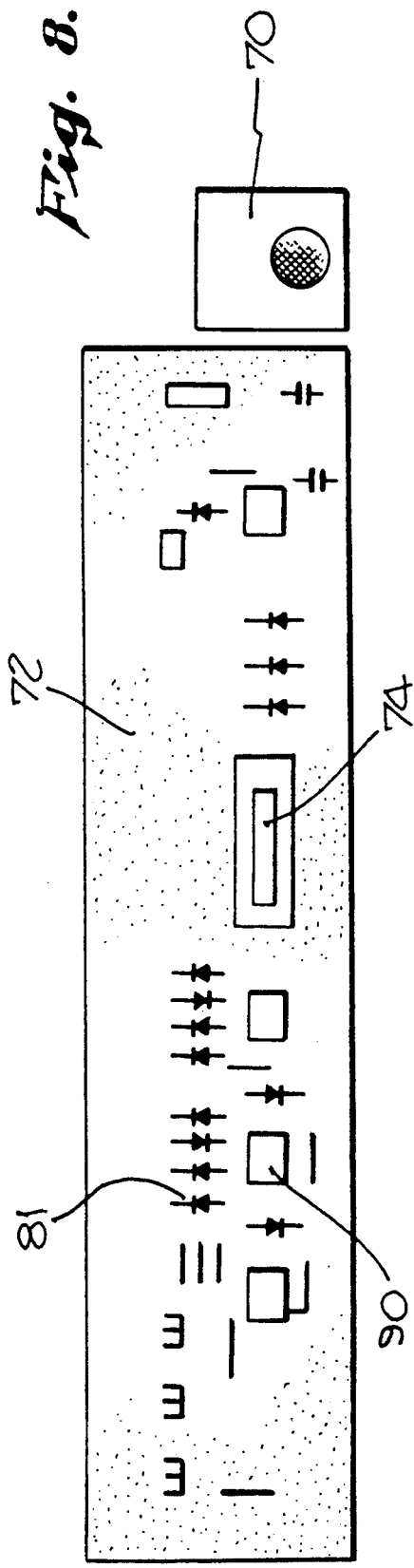
FIG. 8 is a top plan view, partly in schematic form, of a printed circuit board that is positioned underneath the top cover.

An air quality sensing device 70 is mounted on the printed circuit board 72, FIG. 7. It is preferably of type NAP-11AS manufactured by Nemoto & Co., Ltd. It is capable of sensing tobacco smoke, food cooking smells, rotten smell, and organic solvents smell.

Device 70 is exposed through openings 71 in cover 20 to the ambient air that surrounds an exterior portion of the housing 15. Sensing device 70 also has associated with it an adjustable slide switch 74 for selecting a level of air quality to be achieved. The switch 74 is accessible on the upper surface of the top plate 20, see FIG. 7.

An automatic control is cooperatively associated with the air quality sensing device 70, through circuit means not specifically shown, so as to keep the motor, electrostatic precipitator, and ionizing needles energized as long as room air sampled by the sensing device does not meet the selected air quality level. This automatic operation takes place when fan speed switch 80 is in automatic position 81. In the other switch positions the cleaner operates in the manual, rather than automatic, mode. Air quality is indicated by LEDs 90 through openings 91 in the control panel 20.

A control box 82 is mounted in an opening in the back cover 24. Cables extend from the control box to the printed circuit board 72 that is positioned beneath the top plate 20, to the motor 40, and also to a cord 84 for attachment to a wall outlet.

Another feature of importance is a safety switch 88 mounted on the front side of motor support frame 42. When the main filter cartridge is in place it holds this switch in a closed condition, and the motor and other electrical apparatus can then be energized. But if the main filter cartridge is absent, this safety switch, being spring-loaded, will assume an open position, thereby shutting off the flow of all electrical energy within the apparatus.

Additional features include an on-off switch; selection of three different speeds for the fan; a timer which has settings for one, two, four, or eight hours; a filter replacement indicator; a reset button; and an air quality indicator. Three shaded circles containing LEDs indicate the varying grades of air quality. In the air sensoring mode, no LED lights will be lit once the room air quality has met the sensitivity level that has been set on the slide switch 74.

The invention has been described in detail in order to comply with the patent law. However, the scope of the invention is to be measured only by the appended claims.

I claim:

1. An electrically energized air cleaner comprising:
   a housing of generally box-shaped configuration, having a front side with an air intake grill, a back side arranged to be placed against a wall, and a top plate with a fresh air outlet therein;
   a mechanical pre-filter screen mounted within said housing adjacent said air intake grill;
   an electrostatic precipitator mounted within said housing on the inner side of said mechanical pre-filter screen;
   a motor and fan assembly mounted within said housing adjacent said back side of the housing;
   a main filter cartridge mounted within said housing between said electrostatic precipitator and said motor and fan assembly, said main filter cartridge being easily removable by withdrawing it from the bottom of said housing, and including
   (a) a synthetic mesh media made of non-conductive fiber with electrical charges embedded therein; and
   (b) a plastic screen impregnated with activated carbon powder;
   at least one ionizing needle charged at a negative electrical potential, positioned within said housing below said fresh air outlet and within the pathway of fresh air being discharged;
   an air quality sensing device mounted in said housing in communication with outside air and having coupled therewith an adjustable control for selecting a level of air quality to be achieved; and
   an automatic control located in said top plate and cooperatively coupled with said air quality sensing device so as to keep the motor, electrostatic precipitator, and ionizing needle energized so long as room air sampled by said sensing device does not meet the selected air quality level.

2. An air cleaner as in claim 1 wherein said motor and fan assembly includes a rotary cage blower fan, and which further includes a scroll-shaped air duct leading from said blower fan to said fresh air outlet.

3. The air cleaner as in claim 1 which further includes a set of LEDs for indicating current air quality.

4. The air cleaner as in claim 1 wherein said automatic control includes a fan speed switch which also has manually settable fan speed positions.

* * * * *